United States Patent [19]
Reeves

[11] Patent Number: 6,066,252
[45] Date of Patent: May 23, 2000

[54] ALARM MECHANISM FOR CHLORINATOR IN AEROBIC WASTE TREATMENT SYSTEM

[76] Inventor: Gary R. Reeves, Rte. 1, Box 368, Hockley, Tex. 77447

[21] Appl. No.: 09/144,835

[22] Filed: Sep. 1, 1998

[51] Int. Cl.⁷ .............................. B01D 17/12; C02F 1/76; G08B 11/00
[52] U.S. Cl. ............................... 210/86; 177/45; 210/91; 210/198.1; 210/258; 210/532.1; 340/612; 340/613; 422/119; 422/264
[58] Field of Search .................. 210/85, 86, 94, 210/198.1, 169, 206, 97, 143, 258, 91, 257.1, 532.1, 532.2, 754; 177/45, 46, 48, 49, 50; 116/67 R, 109, 215; 422/264, 266, 274–278, 119; 340/612, 613, 615; 417/14

[56] References Cited

U.S. PATENT DOCUMENTS

| | | |
|---|---|---|
| 1,087,958 | 2/1914 | Leavitt . |
| 3,474,817 | 10/1969 | Bates et al. .............................. 210/169 |
| 3,853,481 | 12/1974 | Murray . |
| 3,958,527 | 5/1976 | Iannacone . |
| 4,271,015 | 6/1981 | Moore . |
| 4,883,200 | 11/1989 | Miller et al. ............................... 177/45 |
| 5,215,657 | 6/1993 | Goldfield et al. . |
| 5,236,578 | 8/1993 | Oleskow et al. . |
| 5,306,425 | 4/1994 | Graves ..................................... 210/754 |
| 5,350,512 | 9/1994 | Tang ........................................ 422/264 |
| 5,536,394 | 7/1996 | Lund et al. . |
| 5,536,395 | 7/1996 | Kuennen et al. . |
| 5,569,387 | 10/1996 | Bowne et al. ........................... 210/754 |
| 5,679,243 | 10/1997 | Cho . |
| 5,785,844 | 7/1998 | Lund et al. . |
| 5,885,446 | 3/1999 | McGrew ................................... 210/94 |
| 5,932,093 | 8/1999 | Chulick .................................... 210/169 |

*Primary Examiner*—Joseph W. Drodge
*Attorney, Agent, or Firm*—Keeling Law Firm

[57] ABSTRACT

An alarm mechanism for use in chlorinators using chlorine tablets. The alarm mechanism signals when the chlorine tablets have dissolved to a pre-determined quantity and are in need of replenishment. The alarm mechanism has a low tablet register mechanism and an indicator. The low tablet register mechanism registers when the chlorine tablets dissolve to the pre-determined quantity, and preferably includes a counterweight mechanism calibrated and constructed so that it is activated when the chlorine tablets dissolve to the pre-determined quantity. The indicator indicates when the low tablet register mechanism registers that the chlorine tablets have dissolved to the pre-determined quantity. Preferably, the indicator includes a sensor and an alarm. The sensor senses when the register mechanism registers the dissolution of the chlorine tablets to the pre-determined quantity. The alarm, such as a horn or a light, signals the activation of the sensor. The sensor activates the alarm by direct transmission, in which electrical wiring provides electrical communication between the sensor and the alarm, or by remote transmission, in which an electronic transmitter and receiver provide communication between the sensor and the alarm.

18 Claims, 3 Drawing Sheets

6,066,252

ALARM MECHANISM FOR CHLORINATOR IN AEROBIC WASTE TREATMENT SYSTEM

BACKGROUND OF THE INVENTION

1. Field of Invention

This invention is generally aimed at aerobic waste treatment systems. More specifically, this invention is an alarm which alerts owners of such systems that the treatment media in the systems is in need of replenishment.

Generally, in outlying rural areas, farms and homes are not connected to a city's sewerage and pipeline system. Thus, each of those farms and homes must have its own internal sewerage treatment system. The typical rural sewerage treatment system is normally an aerobic waste treatment system that includes a chlorinator.

Chlorinators are used to disinfect the process flow through the sewer line and utilize chlorine as their treatment or disinfectant media. Chlorine typically dissolves through use. An owner of an aerobic waste treatment system must normally inspect the chlorine cartridge of the chlorinator in order to determine whether the chlorine within the cartridge is in need of replenishment. Because aerobic waste treatment systems are located outside the owner's home, the owner must go outside and must retrieve the chlorine cartridge from the outdoor system in order to determine whether the chlorine is in need of replenishment. It would therefore be beneficial to the prior art to provide an alarm mechanism for chlorinators which alerts owners of such chlorinators, without requiring the owners to leave their home, that the chlorine is in need of replenishment.

Some owners of chlorinators utilize a set schedule to inspect the chlorine cartridge and chlorine remaining therein. However, a set chlorine inspection schedule is impractical because sewerage use, and the dissolution of chlorine caused thereby, is not a constant in any home. Thus, it would be beneficial to the prior art to provide an alarm mechanism for chlorinators which eliminates the need for set chlorine inspection schedules.

Instead or in addition to following a set chlorine inspection schedule, some owners insert a large quantity of chlorine within the chlorine cartridge with the purpose of extending the periods of time between treatment media replenishment. However, in those systems in which chlorine tablets are used, it has been discovered that, if too many tablets are placed within the chlorine cartridge, some of the chlorine tablets are likely to stick to the treatment cartridge thereby prohibiting the proper feeding mechanism of the tablets and the proper operation of the chlorinator. It would thus be beneficial to the prior art to provide an alarm mechanism for chlorinators which eliminates the need to insert a large quantity of chlorine into the treatment cartridge in order to extend the periods of time between chlorine replenishment.

2. Related Art

Applicant does not know of the existence of an alarm mechanism which alerts owners of chlorinators that the chlorine in the systems is in need of replenishment. Other mechanisms which indicate the dissolution or decomposition of certain materials are known to the prior art. Illustrative of such mechanisms are U.S. Pat. No. 1,087,958 that issued to Leavitt on Feb. 24, 1914, U.S. Pat. No. 3,853,481 that issued to Murray on Dec. 10, 1974, and U.S. Pat. No. 3,958,527 that issued to Iannacone on May 25, 1976. These mechanisms, however, are in no way structurally similar to the Applicant's invention and are not generally applicable to aerobic waste treatment systems or chlorinators in particular.

SUMMARY OF THE INVENTION

Accordingly, the object of my invention is to provide, inter alia, an alarm mechanism for chlorinators which alerts the owners of such chlorinators to replenish the chlorine:

without requiring the owners to leave their home;

which eliminates the need for set chlorine inspection schedules; and which eliminates the need to insert a large quantity of chlorine tablets into the chlorine cartridge in order to extend the periods of time between chlorine replenishment.

Other objects of my invention will become envident throughout the reading of this application.

My invention is an alarm mechanism for use in chlorinators or other systems including dissolvable treatment media, such as chlorine tablets. The alarm mechanism signals when the treatment media has dissolved to a pre-determined quantity and is in need of replenishment. The alarm mechanism comprises a low treatment media register mechanism and an indicator means. The low treatment media register mechanism registers when the treatment media dissolves to the pre-determined quantity and preferably comprises a counterweight mechanism calibrated and constructed so that it is activated when the treatment media dissolves to the pre-determined quantity. The indicator means indicates when the low treatment media register mechanism registers that the treatment media has dissolved to the pre-determined quantity. Preferably, the indicator means comprises a sensor means, a signal means, and a transmission means. The sensor means, which preferably comprises a mercury switch, senses when the register mechanism registers the dissolution of the treatment media to the pre-determined quantity. The signal means, such as a horn or a light, signals the activation of the sensor means. The transmission means transmits a signal from the sensor means to the signal means when the register mechanism registers the dissolution of the treatment media to the pre-determined quantity. The transmission means can comprise a direct transmission means, in which electrical wiring provides electrical communication between the sensor means and the signal means, or a remote transmission means, in which a transmitter and a receiver provide communication between the sensor means and the signal means.

DESCRIPTION OF THE INVENTION

Figure 1:
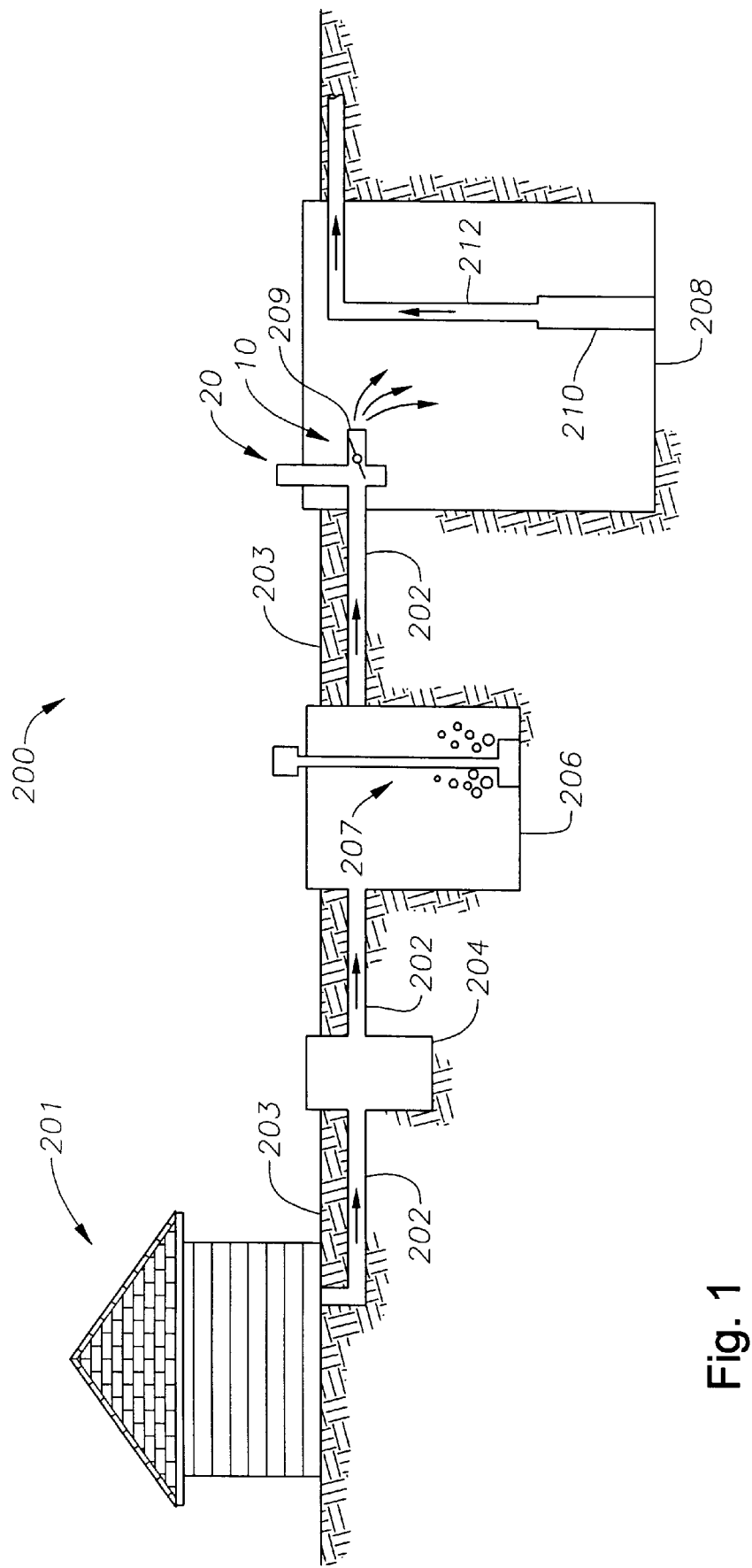
FIG. 1 is a schematic of a typical aerobic waste treatment system, including a chlorinator, with an alarm mechanism of this invention.

The set up of a typical aerobic waste treatment system 200 is shown generally in FIG. 1. The system 200 includes a primary tank 204, a secondary tank 206, and a pump tank 208, each of which is at least partially below ground 203. A sewer line 202 extends from a home 201 to the primary tank 204. Process flow flowing within sewer line 202 is primarily or pre-treated in the primary tank 204. Secondary tank 206 is in fluid communication through a continuation of sewer line 202 with primary tank 204 and includes an aerator means 208. The process flow which has exited primary tank 204 is aerobically treated within secondary tank 206 by aerator means 207. A further continuation of the sewer line 202 provides fluid communication between the secondary tank 206 and the pump tank 208.

The sewer line 202 abruptly ends in a sewer line outlet 209 within and near the top of pump tank 208 so that process flow flowing through sewer line 202 falls out of sewer line outlet 209 into the pump tank 208. A pump 210 at the bottom of pump tank 208 is in fluid communication with a sprinkler line 212. When activated, pump 210 pumps the treated process flow stored within pump tank 208 into and through the sprinkler line 212.

Figure 2:
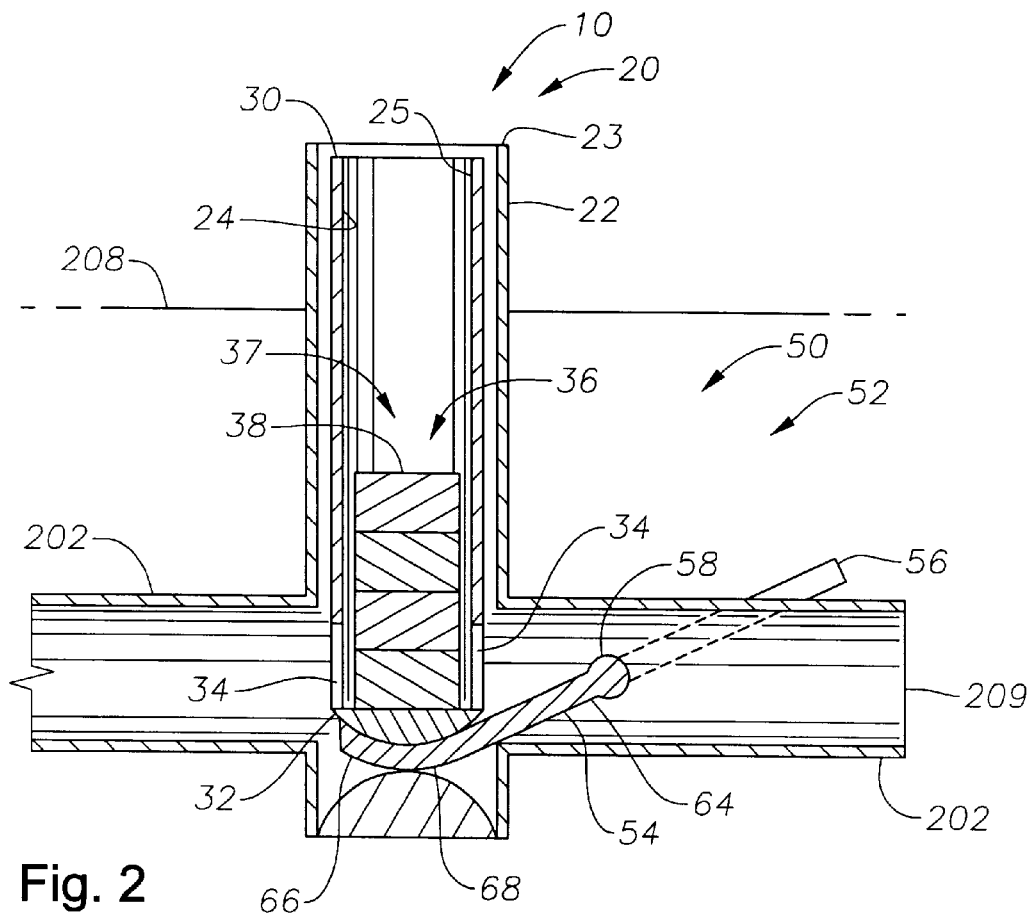
FIG. 2 is a cross-sectional view of one embodiment of the alarm mechanism not activated.

The chlorinator 20 and alarm mechanism 10 intersect the sewer line 202 and are located proximate the sewer line outlet 209. Turning to FIG. 2, a typical chlorinator 20 generally comprises an inlet 22 and a chlorine cartridge 24. Inlet 22 intersects the house or farm's sewer line 202 and extends through pump tank 208 thereby being accessible to people from above-ground. The process flow to be treated flows within sewer line 202.

Chlorine cartridge 24 is hollow and includes a first open end 30 and a second closed end 32. Proximate second closed end 32, chlorine cartridge 24 includes a plurality of passages 34. The plurality of passages 34 are normally located throughout the perimeter of chlorine cartridge 24 thereby allowing fluid communication from one side of the perimeter of chlorine cartridge 24 to the opposite. When in use, chlorine cartridge 24 is deposited within inlet 22 so that second closed end 32 is distal ground surface 28 and so that the plurality of passages 34 are located within sewer line 202. The length of chlorine cartridge 24 is usually such that the first open end 30 is proximate the inlet top 23 so that a person may easily remove chlorine cartridge 24 from inlet 22 from above-ground.

Chlorine 36 is placed within chlorine cartridge 24 so that at least some quantity of chlorine 36 is positioned adjacent to the plurality of passages 34. Typically, and as shown in the Figures, chlorine 36 comprises a plurality of chlorine tablets 38.

Briefly, in operation, as process flow flows through sewer line 202, it flows through the plurality of passages 34 of chlorine cartridge 24. Within the chlorine cartridge 24, the process flow contacts the chlorine 36 and is thus treated by the chlorinator 20. After extended contact with the process flow, the chlorine 36 adjacent the plurality of passages 34 dissolves allowing the chlorine 36 directly above it to fall, by gravity, to the position directly adjacent to the plurality of passages 34. In the embodiment in which chlorine 36 comprises a plurality of chlorine tablets 38, the process flow contacts the lowermost tablet 38 as it flows through chlorine cartridge 24. Eventually, the lowermost tablet 38 dissolves and the tablet 38 immediately above replaces the lowermost tablet 38 by gravity. This process is continued until all of the chlorine 36 has dissolved, at which time a user must replenish it.

This invention is an alarm mechanism for such chlorinators 20. The alarm mechanism is shown as 10 in FIGS. 1–7. Alarm mechanism 10, when activated, warns users of chlorinators 20 that the chlorine 36 has dissolved to a pre-determined quantity thereby necessitating replenishment. Although the alarm mechanism 10 has been described as being used with chlorine 36 as the treatment media, it is understood that the alarm mechanism 10 may be used with any dissolvable treatment media 37. The alarm mechanism 10 will thus be hereinafter described as being used with treatment media 37 stored in a treatment cartridge 25 in general.

Alarm mechanism 10 generally comprises a low treatment media register mechanism 50 and an indicator means 100. Low treatment media register mechanism 50 registers when the treatment media 37 within treatment cartridge 25 has dissolved to a pre-determined quantity. Indicator means 100 indicates to the user when such occurrence has taken place.

In the preferred embodiment, low treatment media register mechanism 50 comprises a counterweight mechanism 52. The counterweight mechanism 52 is calibrated and constructed so that it is activated when the treatment media 37 reaches the pre-determined quantity.

Counterweight mechanism 52 generally comprises a lever 54, a counterweight 56, and a pivot arm 58. Counterweight 56 is calibrated and constructed so that it is activated when the treatment media 37 reaches the pre-determined quantity. Lever 54 is functionally attached to counterweight 56 by way of pivot arm 58. Lever 54 is positioned underneath treatment media 37. In one embodiment shown in FIG. 5, lever 54 is positioned directly underneath treatment media 37. In another embodiment shown in FIG. 2, lever 54 is positioned directly underneath treatment cartridge 25 which contains treatment media 37 therein.

Notably, counterweight 56 and lever 54 are attached to pivot arm 58 so that lever 54 is counter-balanced against counterweight 56. In other words, the weight of counterweight 56 acts against the weight resting on lever 54 about the pivot arm 58.

Pivot arm 58 includes a pivot arm axis 60 and is fixedly attached to counterweight 56 and to lever 54. In the preferred embodiment, pivot arm 58 is pivotally attached to sewer line 202 and is proximate treatment cartridge 25. Also preferably, pivot arm 58 extends within sewer line 202 in a direction transverse to the flow of process within sewer line 202. In this embodiment, pivot arm 58 is pivotally attached to opposite sides of sewer line 202. Preferably, pivot arm 58 is pivotally attached to sewer line 202 intermediate treatment cartridge 25 and sewer line outlet 209.

Figure 3:
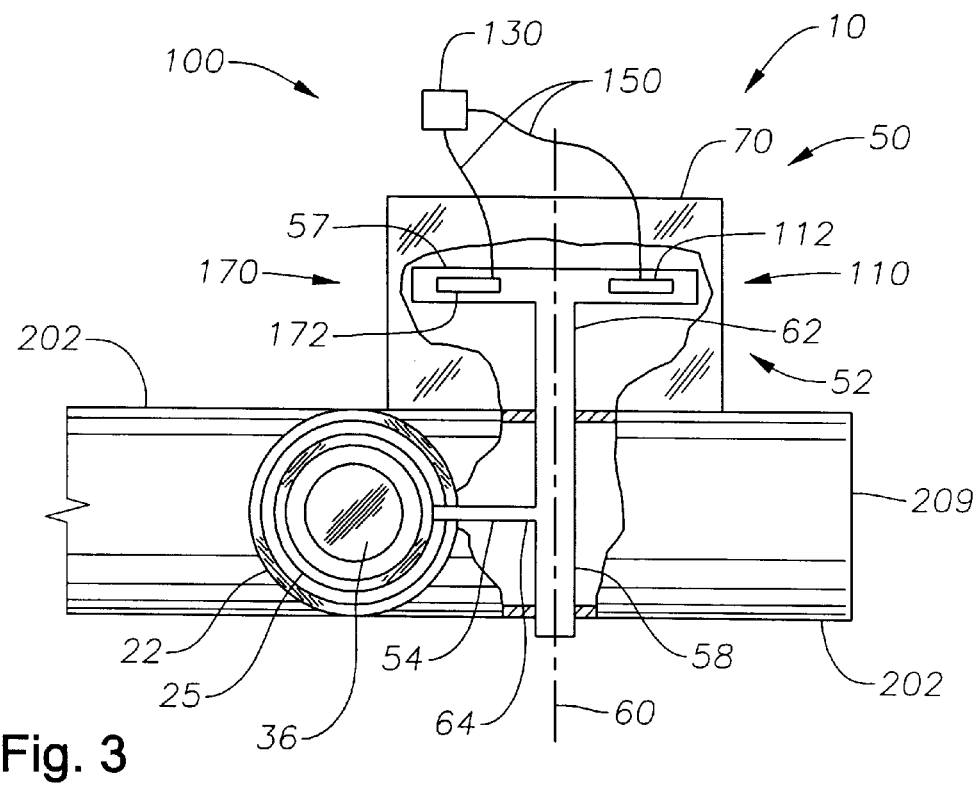
FIG. 3 is a top cut-away view of one embodiment of the alarm mechanism.

In the preferred embodiment, counterweight 56 is fixedly attached to pivot arm 58 exterior to sewer line 202. In this embodiment, at least one end 62 of pivot arm 58 extends past sewer line 202 to counterweight 56. Counterweight 56 is then attached to pivot arm end 62. In one embodiment as shown in FIG. 3, a container 70 surrounds counterweight 56 in the exterior of sewer line 202 and within pump tank 208. Container 70 is large enough to enable the unobstructed pivoting motion of counterweight 56 about pivot arm axis 60 therein. In another embodiment, pivot arm end 62 and counterweight 56 are freely suspended exterior to sewer line 202 and within pump tank 208.

Lever 54 is fixedly attached to pivot arm 58 interior of sewer line 202. Lever 54 includes an attachment end 64 and a lifting end 66. Lever 54 is fixedly attached to pivot arm 58 at lever attachment end 64. Lever lifting end 66 is positioned underneath treatment media 37. In the preferred embodiment shown in FIG. 5, lever lifting end 66 is positioned directly underneath treatment media 37. In another embodiment shown in FIG. 2, lever lifting end 66 is positioned directly underneath treatment cartridge 25 which contains treatment media 37 therein.

Figure 5:
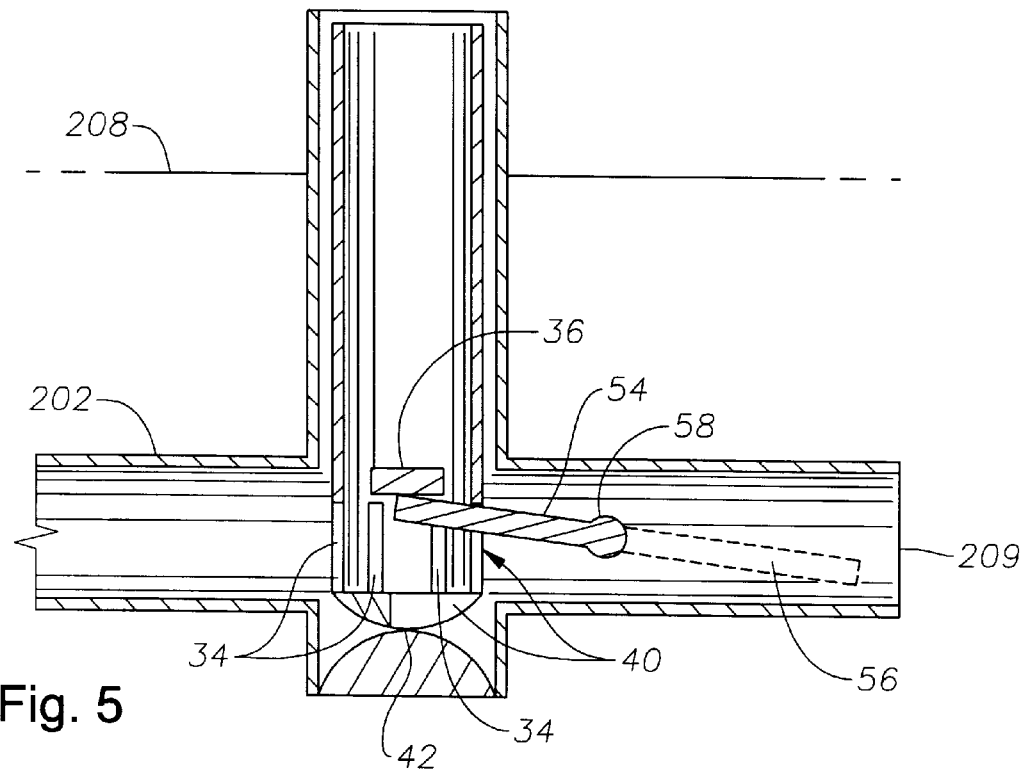
FIG. 5 is a cross-sectional view of one embodiment of the alarm mechanism activated and including the treatment cartridge of FIG. 3.
Figure 4:
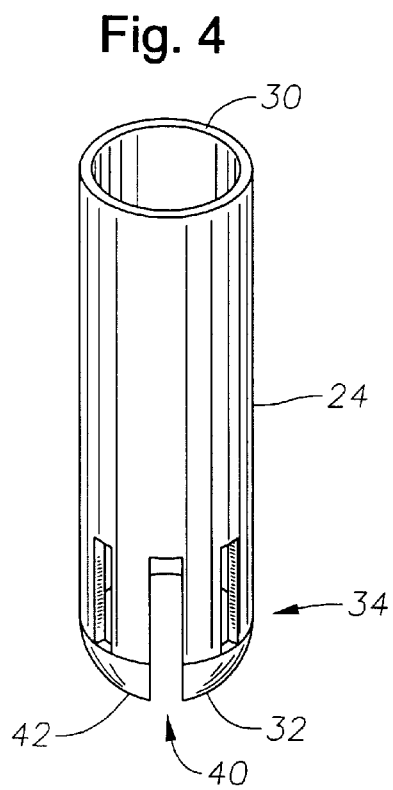
FIG. 4 is an isometric view of the treatment cartridge utilized with one embodiment of the alarm mechanism.
Figure 6:
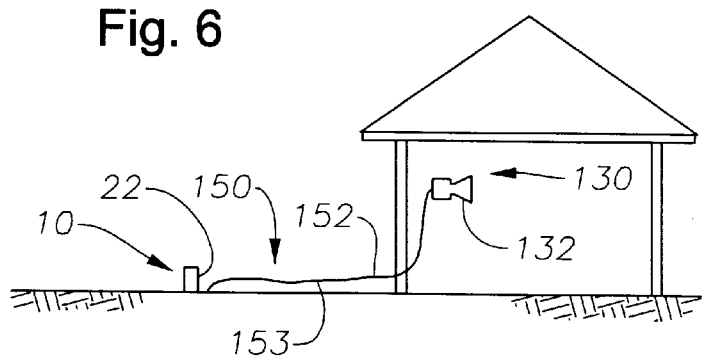
FIG. 6 is a schematic of the direct transmission means and of one embodiment of the signal means.

In the preferred embodiment in which lever lifting end 66 is positioned directly underneath treatment media 37, treatment cartridge 25 includes a lever slot 40 on its bottom 42. As seen in FIGS. 4 and 5, lever slot 40 extends from cartridge bottom 42 upwards proximate pivot arm 58 along treatment cartridge 25. In this embodiment, the pivoting motion of lever 54 about pivot arm axis 60 is within lever slot 40 and treatment cartridge 25.

Lever 54 may also include a curved section 68 coinciding with lever lifting end 66. When lever lifting end 66 is located thereunder, curved section 68 matches the outline of treatment cartridge bottom 42 or treatment media 37, depending on the embodiment as previously discussed.

Indicator means 100 generally comprises a sensor means 110, a signal means 130, and a transmission means 150. Sensor means 110 senses when the low treatment media register mechanism 50 registers the pre-determined quantity of treatment media 37. Transmission means 150 transmits such occurrence from sensor means 110 to signal means 130. Signal means 130 signals such occurrence to the user of the chlorinator 20.

In the preferred embodiment, sensor means 110 comprises a first mercury switch 112. First mercury switch 112 is able to detect the pivoting motion of counterweight 56 about pivot arm 58. Preferably, first mercury switch 112 is attached to counterweight 56.

Figure 7:
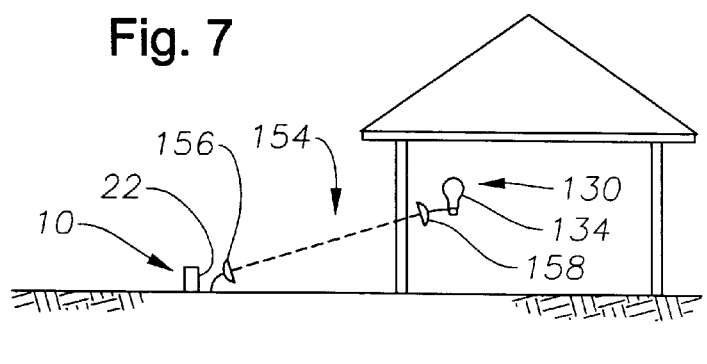
FIG. 7 is a schematic of the remote transmission means and of one embodiment of the signal means.

Transmission means 150 comprises a direct transmission means 152 in one embodiment (see FIG. 6) and a remote transmission means 154 in another embodiment (see FIG. 7). Direct transmission means 152 comprises electrical wiring 153 which provides direct electrical communication between sensor means 110 and signal means 130. Remote transmission means 154 comprises a communicating transmitter 156 and receiver 158. Transmitter 156 is in electrical communication with sensor means 110. Receiver 158 is in electrical communication with signal means 130. Receiver 158 is able to receive and acknowledge the signal emitted by transmitter 156 from a remote location.

Signal means 130 may comprise a variety of warning devices to alert the user of alarm mechanism 10. In one embodiment, signal means 130 comprises a horn 132. In another embodiment, signal means 130 comprises a light 134. In yet another embodiment, signal means 130 comprises horn 132 in combination with light 134.

It is understood that indicator means 100 is created so that signal means 130 can be located distal to chlorinator 20, including inside a user's home 201. This placement, which is preferable, is enabled by the remote transmission means 154 or by laying the necessary amount of electrical wiring 153 for the direct transmission means 152.

Alarm mechanism 10 may also include a pump switch means 170. Pump switch means 170 automatically activates or deactivates the pump 210 within pump tank 208 depending on whether low treatment media register mechanism 50 has registered the pre-determined quantity of treatment media 37. If the pre-determined quantity of treatment media 37 has not been registered by low treatment media register mechanism 50, then pump switch means 170 maintains the pump 208 activated. If the pre-determined quantity of treatment media 36 has been registered by low treatment media register mechanism 50, then pump switch means 170 deactivates the pump 208. In one embodiment, pump switch means 170 and sensor means 110 comprise one two-way mercury switch. In the preferred embodiment, pump switch means 170 comprises a second mercury switch 172. Second mercury switch 172 is able to detect the pivoting motion of counterweight 56 about pivot arm 58. In this preferred embodiment, mercury switch 172 is attached to an extension 57 of counterweight 56 which is substantially co-linear with counterweight 56 but is located at the opposite side of pivot arm 58 and pivot arm end 62.

In Operation

As previously disclosed, as waste flows through sewer line 202 and treatment cartridge 25, it gradually dissolves the treatment media 37 that it contacts. When only the pre-determined quantity of treatment media 37 remains within treatment cartridge 25, low treatment media register mechanism 50 registers such occurrence, and indicator means 100 indicates such occurrence to the user.

More particularly and in the preferred embodiment including counterweight mechanism 52, when only the pre-determined quantity of treatment media 37 remains within treatment cartridge 25, the weight acting on lever lifting end 66 no longer counterbalances the counterweight 56. Without sufficient weight opposing it, counterweight 56 pivots downward about pivot arm 58 and pivot arm axis 60. At this point, counterweight 56 weighs more than the weight acting on lever lifting end 66. It is noted that, depending on the embodiment, the weight acting on lever lifting end 66 is either the weight of the remaining treatment media 37 (the embodiment of FIG. 5) or the aggregate weight of the remaining treatment media 37 and the treatment cartridge 25 (the embodiment of FIG. 2). It is also noted that the pivoting motion of counterweight 56 exterior to sewer line 202 is enabled by its free suspension within pump tank 208 or its containment within container 70, depending on the embodiment.

The pivoting motion of pivot arm 58 caused by the downward motion of counterweight 58 also prompts lever 54 to pivot about pivot arm 58 upwardly. As it pivots upwardly, lever 54 in turn lifts the remaining treatment media 37 (or the remaining treatment media 37 and treatment cartridge 25) upwardly.

When counterweight 56 pivots downwardly and lever 54 pivots upwardly past a pre-specified point, sensor means 110 is activated. As is well-known in the art, in the embodiment including first mercury switch 112, first mercury switch 112 is activated by the flow of mercury within the switch caused by the pivoting motion of counterweight 56.

In the relevant embodiment, pump switch means 170 is also activated when counterweight 56 pivots downwardly and lever 54 pivots upwardly past a pre-specified point. As is well-known in the art, in the embodiment including second mercury switch 172, second mercury switch 172 is activated by the flow of mercury within the switch caused by the pivoting motion of counterweight 56. The activation of pump switch means 170 sends an electrical signal to pump 210 deactivating the pump 210, as previously disclosed.

The activation of sensor means 110 sends an electrical signal from sensor means 110 to signal means 130 through transmission means 150. In the embodiment including direct transmission means 152, the electrical signal is sent through the electrical wiring 153. In the embodiment including remote transmission means 154, the electrical signal is sent to the transmitter 156 which emits a signal received by receiver 158. In turn, receiver 158 forwards the electrical signal to the signal means 130.

Upon receipt of the electrical signal, signal means 130 is activated. Activation of the signal means 130 in turn prompts the sounding of the horn 132 and/or the lighting of the light 134, depending on the embodiment of signal means 130. As previously disclosed, signal means 130 is preferably located interior to the owner's home 201. Thus, the owner easily notices the activation of signal means 130 (by the sound of horn 132 and/or the lighting of light 134) and recognizes that the treatment media 37 needs to be replenished. Importantly and conveniently, the owner makes this recognition without having to leave his/her home 201.

Once the owner is alerted by signal means 130 that the treatment media 37 is in need of replenishment, the owner need only remove the treatment cartridge 25 from the inlet 22 and introduce additional treatment media 37 within treatment cartridge 25. When reinserting the treatment cartridge 25 back into inlet 22, the user must ensure that lever 54 is directly underneath the cartridge bottom 42 (in the embodiment not including lever slot 40—FIG. 2) or that lever 54 is within lever slot 40 and directly underneath the treatment media 37 (in the embodiment including lever slot 40—FIG. 5).

At this point, alarm mechanism 10 is back to its original condition in which the weight resting on lever lifting end 66 is greater than counterweight 56. Thus, sensor means 110 has deactivated thereby also deactivating signal means 130 and pump switch means 170 has activated thereby powering the pump 210.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. An alarm mechanism for use with chlorinator systems including treatment media, comprising:
    a low treatment media register mechanism that registers when said treatment media dissolves to a pre-determined quantity;
    an indicator means for indicating when said register mechanism registers the dissolution of said treatment media to said pre-determined quantity; and
    said register mechanism comprising a counterweight mechanism calibrated and constructed so that it is activated when said treatment media dissolves to said pre-determined quantity.

2. A mechanism as claimed in claim 1, wherein:
    said counterweight mechanism comprises a lever and a counterweight;
    said lever is positioned underneath said treatment media; and
    said counterweight is functionally attached to said lever.

3. A mechanism as claimed in claim 2, wherein:
    said counterweight mechanism further comprises a pivot arm having a pivot arm axis;
    said pivot arm is attached to said lever;
    said pivot arm is attached to said counterweight;
    said lever and said counterweight are oppositely oriented about and normal to said pivot arm axis;
    said lever and said counterweight are in a first position when a force of said treatment media on said lever exceeds a force of said counterweight; and
    said lever and said counterweight rotate about said pivot arm axis to a second position when said treatment media dissolves to said predetermined quantity.

4. A mechanism as claimed in claim 3, wherein:
    said pivot is arm pivotally attached to a flow line;
    said counterweight is located exterior to said flow line; and
    said lever is located interior to said flow line.

5. A mechanism as claimed in claim 4, further comprising;
    a container covering said counterweight; and
    said container allowing said counterweight to freely pivot about said pivot arm axis upon activation.

6. A mechanism as claimed in claim 1, wherein said indicator means comprises:
    a sensor means for sensing when said register mechanism registers the dissolution of said treatment media to said pre-determined quantity;
    a signal means for signaling the activation of said sensor means; and
    a transmission means for transmitting a signal from said sensor means to said signal means when said register mechanism registers the dissolution of said treatment media to said pre-determined quantity.

7. A mechanism as claimed in claim 6, wherein said sensor means comprises a first mercury switch attached to said counterweight.

8. A mechanism as claimed in claim 6, wherein said signal means comprises a horn.

9. A mechanism as claimed in claim 6, wherein said signal means comprises a light.

10. A mechanism as claimed in claim 6, wherein:
    said transmission means comprises a direct transmission means; and
    said direct transmission means comprises electrical wiring providing electrical communication between said sensor means and said signal means.

11. A mechanism as claimed in claim 6, wherein:
    said transmission means comprises a remote transmission means;
    said remote transmission means comprises a transmitter in electrical communication with said sensor means and a receiver in electrical communication with said signal means;
    said transmitter sending a signal when said register mechanism registers the dissolution of said treatment media to said pre-determined quantity; and
    said receiver receiving said signal from said transmitter.

12. An alarm mechanism for use with chlorinator systems including treatment media, comprising:
    a low treatment media register mechanism that registers when said treatment media dissolves to a pre-determined quantity; and
    an indicator means operable for indicating when said register mechanism registers the dissolution of said treatment media to said pre-determined quantity;
    said low treatment media register mechanism being located upstream of a tank having a pump therein;
    said pump pumping out of said tank a process flow treated by said treatment media; and further comprising
    a pump switch means operatively connected to said low treatment register mechanism; and
    said pump switch means deactivating said pump when said register mechanism registers the dissolution of said treatment media to said pre-determined quantity.

13. A mechanism as claimed in claim 12, wherein said pump switch means comprises a mercury switch.

14. A low-media register for use in a chlorinator for an aerobic waste treatment system comprising:
   a chlorine cartridge having a first end and a second end;
   said second end being oriented within a flow line of said aerobic waste treatment system;
   said chlorine cartridge having a cartridge wall;
   a plurality of passages provided in said cartridge wall proximate said second end allowing fluid communication with said flow line;
   a lever slot provided in said cartridge wall proximate said second end; and further comprising
   a lever comprising a pivot arm, a lever lifting end and a counterweight;
   said flow line having a flow line wall;
   said pivot arm supported by and disposed through said flow line wall;
   said pivot arm having a pivot arm axis;
   said lever lifting end and said counterweight attached to said pivot arm on opposite sides of said pivot arm axis;
   said lever lifting end and said counterweight rotating about said pivot arm axis;
   said lever lifting end disposed through said lever slot;
   whereby said lever and said counterweight in a first position when a force of said treatment media on said lever exceeds a force of said counterweight, and said lever and said counterweight rotating about said pivot arm axis to a second position when said treatment media dissolves to said predetermined quantity.

15. A low-media register as in claim 14, further comprising:
   a sensor means operable for sensing rotation of said lever to said second position;
   a signal means operable for signaling the activation of said sensor means; and
   a transmission means operable for transmitting a signal from said sensor means to said signal means when said lever is rotated to said second position.

16. A low-media register as in claim 15, wherein:
   said transmission means comprises a direct transmission means; and
   said direct transmission means comprises electrical wiring providing electrical communication between said sensor means and said signal means.

17. A low-media register as in claim 15, wherein:
   said transmission means comprises a remote transmission means;
   said remote transmission means comprises an electronic transmitter in electrical communication with said sensor means and a receiver in electrical communication with said signal means;
   said electronic transmitter sending a signal when said register mechanism registers the dissolution of said treatment media to said pre-determined quantity; and
   said receiver receiving said signal from said transmitter.

18. A low-media register as in claim 15, wherein:
   said low-media register is located upstream of a tank having a pump therein;
   said pump pumping out of said tank a process flow treated by said chlorine tablets;
   said register further comprising a pump switch means; and
   said pump switch means deactivating said pump when said sensor means registers the rotation of said lever to said second position.

* * * * *